April 4, 1939.　　H. G. DAVIS　　2,152,792
COFFEE MAKER
Filed March 29, 1937　　2 Sheets-Sheet 1
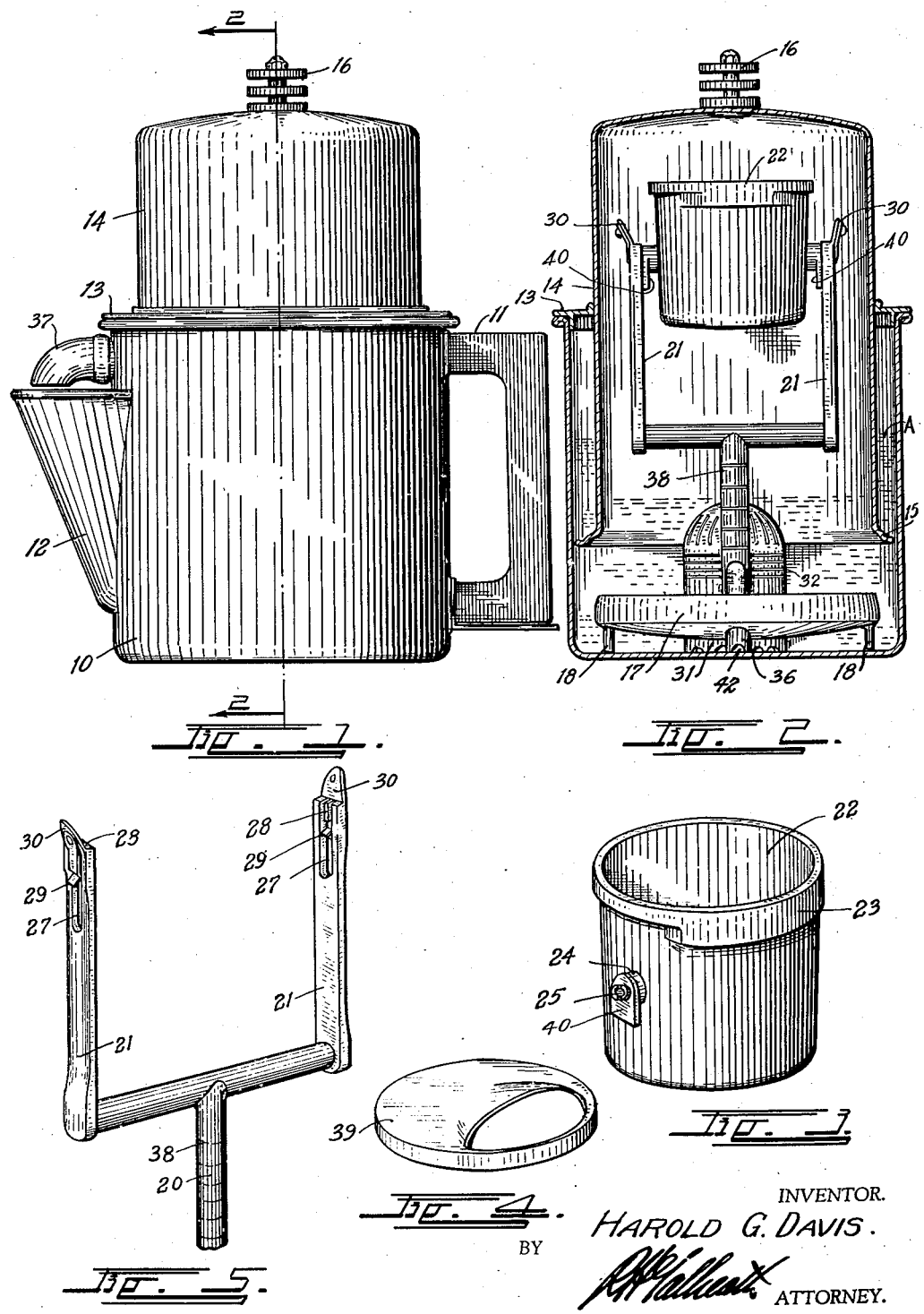
INVENTOR.
HAROLD G. DAVIS.
BY
ATTORNEY.

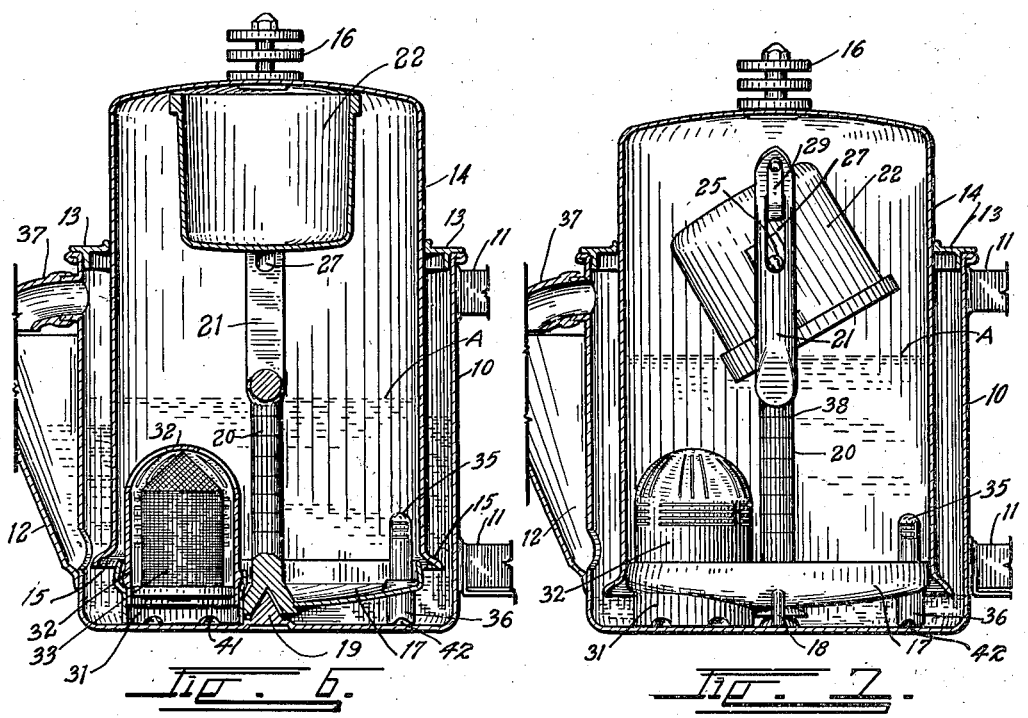
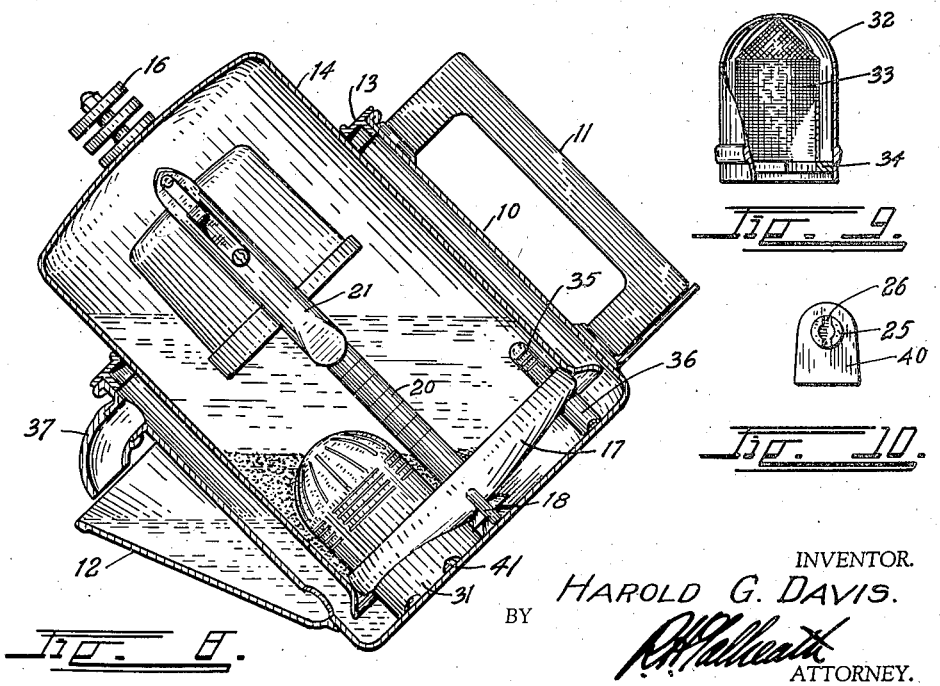

Patented Apr. 4, 1939

2,152,792

UNITED STATES PATENT OFFICE 2,152,792

COFFEE MAKER

Harold G. Davis, Denver, Colo.

Application March 29, 1937, Serial No. 133,564

7 Claims. (Cl. 53—3)

This invention relates to a coffee maker of the type illustrated and described in applicant's copending application Ser. No. 30,458. The principal object of this invention is to provide the provision of a coffee maker which will support the ground coffee out of contact with the water while the water is being brought to the boiling point and until it has ceased boiling so that it will be impossible to boil the coffee grounds in the water.

Another object of the invention is to provide a coffee maker which will remove the grounds from the water should the water be again brought to the boiling point.

Other objects of the invention are to provide a coffee maker which will automatically and positively deposit the coffee in the water at the proper time; which will fuse and brew the coffee under a vacuum seal so that no gases or aroma can escape from the time the ground coffee enters the water until the coffee is poured into the cup; which will simultaneously draw off the coffee from above and below the grounds so that a uniform product will be delivered at all times; which will automatically surround the hot coffee with an air jacket which will act as a heat insulation to maintain the coffee hot until used; to provide means for immediately and instantly removing all grounds from the coffee when desired; and to provide a coffee maker which will be easy to use and easy to cleanse.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a side elevation of the improved coffee maker as it would appear when filled ready to be heated.

Fig. 2 is a cross section therethrough, taken on the line 2—2, Fig. 1.

Fig. 3 is a detail perspective view of the ground coffee receiver.

Fig. 4 is a detail view of a cap which may be used on the receiver.

Fig. 5 is a detail view of the coffee receiver yoke.

Fig. 6 is a cross section through the coffee maker at the intermediate position.

Fig. 7 is a cross section at the final or brewing position.

Fig. 8 is a similar cross section illustrating the pouring position.

Fig. 9 is a detail view of the strainer.

Fig. 10 is a detail view of the receiver pivot.

The invention comprises an outer container 10 having the usual handle 11 and spout 12. An annular lid 13 is fitted into the outer container 10 and acts as a guide for a vertically movable inner container 14. The inner container is open at its bottom and around this opening the side walls are belled outwardly as shown at 15. It is provided with a suitable finger knob 16 by means of which it may be lifted.

A ground tray 17 is supported within the container 10 upon suitable legs 18. The tray is always centrally located in the container 10 by means of a locating point 19 in the bottom which fits in a recess in the bottom of the tray 18. A post 20 projects upwardly from the tray 17 to support a U-shaped yoke 21, between the sides of which a ground coffee receiver 22 is suspended.

The receiver 22 is counterweighted as shown at 23 so that it will always be off balance. From opposite sides of the receiver pivot bosses 24 project. The bosses 24 support guide flaps 40 and pivot members 25. The pivot members are vertically grooved as shown at 26. The upper extremities of the arms of the yoke 21 are formed with vertical pivot slots 27, in the upper portion of each of which is a vertical tongue 28. A supporting spring 29 extends into each slot below the tongue 28. The yoke sides are turned outwardly at their tops, as shown to form guide members 30.

The tray 17 is surrounded by an upturned, rounded flange of a diameter to fit snugly into, and be gripped by, the belled lower bottom of the inner container 14. An annular sleeve 31 passes through the tray at one side of the post 20 for receiving a strainer dome 32 in which a series of relatively narrow slots are cut. An inverted cup-shaped screen 33 is fitted into the strainer dome 32. The screen is formed on a flange 34 which fits tightly into the dome 32. At the side opposite the dome of the tray 17 is an air nipple 35 also having relatively narrow slots. The air nipple 35 fits into an air sleeve 36 extending downwardly through the tray to form one of the legs therefor.

An overflow neck 37 extends from the upper portion of the container 10 over the spout 12 to direct any overflowing or boiling water into the spout 12. This neck is removable for cleaning purposes.

In use, the desired amount of water is placed in the container 10. The standard 20 is divided into divisional marks 38 by means of which the amount of water can be determined. The required amount of ground coffee is placed in the receiver 22 and the latter is set into the yoke 21 with the tongues 28 extending into the slots 26 of the pivot members 25, and the latter resting on the springs 29. When in this position the tongues 28 hold the receiver upright. The inner container, with the lid 13, is now set on the outer container and will float at approximately the position indicated in Fig. 2, due to the entrapped air therein.

The container is now placed upon the fire and, as the water becomes heated, the air in the inner container expands, bubbles beneath the lower edge thereof, and escapes. This air will be replaced by the highly expanded vapor from the water which will keep the inner container dancing on the surface of the water while the latter is boiling. It will be noted that no water can reach the coffee in the receiver 22 at this time.

When the water has been brought to a boil, the heat is cut off. This allows the vapor in the inner container to contract and condense, as it does the inner container gradually sinks into the water until it comes to the intermediate position of Fig. 6, at which time, the entire weight will be resting on the receiver 22. As the water continues to rise in the inner container the weight still further increases, until a point is reached when the springs 29 can no longer support the receiver 22. This allows the pivot members 25 to drop to the bottom of the pivot slots 27, where the pivots are free to rotate and, since the receiver is out of balance, it will upset as shown in Fig. 7, and deposit the coffee into the ground tray 17.

The sudden release of the receiver allows the outer container to fall, causing it to wedge and seal itself around the ground tray 17. As the vapors still further contract in the inner container, the remainder of the water in the outer container will be drawn through the screen 33 as shown in Fig. 1, until the water level in the outer container reaches the bottom of the sleeves 31 and 36. Air will now be drawn in through the screen and through the air nipple to agitate the water and assist the brewing action.

When the coffee has brewed sufficiently it may be poured by inverting the coffee maker as shown in Fig. 8. This allows the coffee to flow through the strainer and the screen into the outer container and from the spout 2.

It is desired to call attention to the fact that at this time, the solution is being drawn into the dome strainer from both above the coffee grounds and from below the grounds so that a mixture of strengths is withdrawn. In the usual pot, the coffee is poured from the top of the solution, taking only the weaker mixture and allowing only the final cups to be exceedingly strong. In this pot, it is drawn simultaneously from above and below the grounds. Air to take the place of the discharging coffee is drawn through the air tip 35 from the upper part of the container 10 into the inner container 14. If desired, a cap such as indicated at 39 in Fig. 4 may be placed in the coffee receiver 22 to prevent the entire contents from dumping at one time. The cap causes the coffee to pour out slowly and uniformly.

The guide flaps 40 bear and slide against the inner faces of the yoke to prevent the receiver from tilting and "cocking" sideways.

The sleeve 31 and the sleeve 36 rest upon the bottom of the container and are provided with notches 41 and 43 respectively to allow the water and air to enter at their bottoms. After the position of Fig. 7 has been reached, the vacuum in the inner container will continue to increase until the water from below the tray 17 has been drawn into the inner container down to the level of the notches 41 and 42. After this point has been reached, air will be drawn through the notches to agitate the grounds and assist the brewing.

It will be noted that when this point is reached there is an air jacket formed completely around and below the inner container and that the top of the coffee is under a partial vacuum. This reduces the transfer of heat to a minimum and the coffee will remain hot for hours.

Each time a cup is poured the vacuum will again draw the coffee into the inner container to preserve the air seal. The small amount of air which enters at the air tip 35 is only sufficient to replace the coffee withdrawn and not sufficient to break the vacuum.

The tray 17 also serves to hold the grounds away from the bottom of the outer container to allow free boiling to take place.

In applicant's former application, Serial No. 30,458, the weight of the coffee grounds was placed upon the inner container. This of course increased the displacement of the inner container and caused the water to rise extremely high in the outer container. By placing the weight upon a post extending from the bottom of the outer container, the inner container will float high and reduce the necessary dimensions of the outer container.

The inner container wedges itself sufficiently tight to the tray 17 to allow the entire assembly to be lifted from the outer container by means of the knob 16. Thus, the grounds can be compeltely removed from the container when desired.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:

1. A coffee maker comprising: an open topped outer container; an open bottomed inner container vertically movable in said outer container; a coffee receiver in said inner container; and means for discharging the coffee from said receiver, said means being operable by the descending movement of said inner container.

2. A coffee maker comprising: an open topped outer container; an open bottomed inner container vertically movable in said outer container; a coffee receiver in said inner container; a releasable support for said receiver; and means for releasing said support in consequence of the descending movement of said inner container to release the coffee from said receiver.

3. A coffee maker comprising: an open topped outer container; an open bottomed inner container vertically movable in said outer container; a coffee receiver in said inner container; and means for upsetting said receiver to discharge the coffee therefrom when said inner container descends to a certain predetermined position.

4. A coffee maker comprising: an open topped water container; a ground tray in said water container; an open bottomed inner container normally supported in said outer container by the water therein yet free to descend to said ground tray when evacuated of air; a coffee receiver for supporting ground coffee within said inner container above the normal water level therein; and means for discharging the coffee from said receiver into said tray when said inner container has descended to a predetermined point.

5. A coffee maker comprising: an open topped water container; a ground tray in said water container; an open bottomed inner container normally supported in said outer container by the water therein yet free to descend to said ground tray when evacuated of air; a coffee receiver for supporting ground coffee within said inner container above the normal water level therein; and means for discharging the coffee from said receiver into said tray when said inner container has descended to a predetermined point, the relative sizes of said inner container and said ground tray being such that said inner container will seal itself to said tray when it reaches its lowermost point.

6. A coffee maker comprising: an open topped water container; a ground tray in said water container; an open bottomed inner container normally supported in said outer container by the water therein yet free to descend to said ground tray when evacuated of air; a supporting member extending upward in said inner container; a tiltable coffee receiver supported by said supporting member; means for holding said receiver from tipping; and means for releasing said holding means when said inner container has descended to a predetermined point so as to discharge the coffee from said receiver into said tray.

7. A coffee maker comprising: an open topped water container; a ground tray in said water container; an open bottomed inner container normally supported in said outer container by the water therein, yet free to descend to said ground tray when evacuated of air; a coffee receiver for supporting ground coffee within said inner container above the normal water level therein; and means for discharging the coffee from said receiver into said tray when said inner container has descended to a predetermined point, the relative sizes of said inner container and said ground tray being such that said inner container will seal itself to said tray when it reaches its lowermost point, there being screened passages through said tray for the passage of air and water.

HAROLD G. DAVIS.